United States Patent [19]

Laux et al.

[11] Patent Number: 5,661,981
[45] Date of Patent: Sep. 2, 1997

[54] PROCESS AND APPARATUS FOR THE GRANULATION OF GRANULATABLE AND/OR PELLETIZABLE SUBSTRANCES

[75] Inventors: Peter Laux, Lutzrath; Stefan Kosock, Krefeld, both of Germany

[73] Assignee: Buse Gese GmbH & Co., Germany

[21] Appl. No.: 443,232

[22] Filed: May 17, 1995

[30] Foreign Application Priority Data

May 31, 1994 [DE] Germany ............... 44 19 010.7

[51] Int. Cl.$^6$ ............... F25D 3/10; B65G 49/04; B07B 13/00; B01F 7/04
[52] U.S. Cl. ............... 62/64; 62/67; 62/68; 62/74; 62/347; 62/375; 62/376
[58] Field of Search ............... 62/63, 64, 67, 62/68, 74, 375, 376, 347

[56] References Cited

U.S. PATENT DOCUMENTS

| | | | |
|---|---|---|---|
| 2,751,762 | 6/1956 | Colton | 62/74 X |
| 3,162,019 | 12/1964 | Porter et al. | 62/67 |
| 3,228,838 | 1/1966 | Rinfret et al. | 62/74 X |
| 3,447,337 | 6/1969 | Skruch et al. | 62/64 X |
| 4,211,015 | 7/1980 | Adams et al. | 62/64 X |
| 4,655,047 | 4/1987 | Temple et al. | 62/64 |
| 4,843,840 | 7/1989 | Gibson | 62/64 X |
| 4,848,094 | 7/1989 | Davis et al. | 62/64 |
| 4,888,956 | 12/1989 | le Roux Murray | 62/64 X |
| 4,982,577 | 1/1991 | Milankov et al. | 62/375 X |
| 5,219,383 | 6/1993 | Minari et al. | 62/74 X |
| 5,522,237 | 6/1996 | Wardle | 62/63 X |

FOREIGN PATENT DOCUMENTS 43 29 110 C1  10/1994  Germany.

*Primary Examiner*—Christopher Kilner
*Attorney, Agent, or Firm*—Connolly & Hutz

[57] ABSTRACT

The invention relates to a process and an apparatus for the granulation of granulatable and/or pelletizable substances in which the substance to be granulated is introduced in the form of a closed jet into a rapidly flowing refrigerant—preferably liquid nitrogen. This purpose is served by a vertically arranged reaction tube (2) into the upper part of which the jet enters and through which the refrigerant circulates by means of a transport element (7).

16 Claims, 2 Drawing Sheets

PROCESS AND APPARATUS FOR THE GRANULATION OF GRANULATABLE AND/OR PELLETIZABLE SUBSTRANCES

BACKGROUND OF THE INVENTION

The invention relates to a process for the granulation of granulatable and/or pelletizable substances.

In German Application P 43 29 110 of the applicant a process and an apparatus suitable for carrying out the process are described, in which pelletizable liquids are pelletized by being introduced into a waterfall-like stream of a refrigerant. When droplets impact onto the surface of the refrigerant flowing in the manner of a waterfall, the droplets, which preferably have a lower dripping velocity than the flow velocity of the refrigerant, are entrained and thus isolated. Agglomerization of the particles on introduction can thus be prevented. The process is particularly advantageous if small pellets are to be generated, since high throughputs can be achieved with low space requirement.

U.S. Pat. No. 4,843,840 shows an apparatus for the production of frozen solid particles in which the liquids to be frozen are transported into a discharge apparatus by a refrigerant through pipes which are adjustable in height at the upper end.

By means of the process according to the application P 43 29 110, pellet products can be produced, for the starting materials of which certain boundary conditions must be established with respect to surface tension and viscosity. Thus not all customer requirements can be covered.

SUMMARY OF THE INVENTION

The object therefore underlying the invention is to provide a process and an apparatus by which granules can be generated substantially independently of the viscosity and surface tension of the starting materials. By means of the process, substances are also to be able to be processed which are not pelletizable and which have a very high solids or particle content.

Surprisingly it has now been found that starting materials can be granulated substantially independently of their viscosity and surface tension if they are allowed to enter in a closed jet into the moving volume of a refrigerant. In this case, the jet which is still closed on entry into the, for example, waterfall-like volume stream of the refrigerant is broken up to form granules as a result of the high velocity of the refrigerant stream and the forces occurring as a result. In the course of this as a result of the coldness of the refrigerant, for example liquid nitrogen, the said jet is fixed in its shaping and is frozen out.

By means of the process according to the invention, independently of viscosity and surface tension, a much higher throughput can be achieved than in the above-described prior art. As a result of penetration of the jet into a volume, in comparison to impacting on a surface, a significantly greater heat exchange capacity is made available in a small space. Disintegration into granule particles does not occur by atomization at a nozzle sheet but as a result of the refrigerant. Thus complex feed apparatuses such as nozzle sheet plates which, depending on the product to be processed, can even block, can be dispensed with. Cleaning operations are largely dispensed with; rather the product feed apparatus can be cleaned by flushing a wash medium through a feed tube. Change of nozzle when there is change of production is dispensed with, since nozzle sheets specially adapted for the product to be granulated do not need to be used. Solid particles can be introduced without problem with a liquid jet and any liquid which may be pumped can he processed. By means of the process according to the invention, instant granules of foods can also be produced which would not be acceptable to the consumer in pellet form. A process has thus been created which also satisfies optical product requirements. A further advantage of the process according to the invention is that pasty, pumpable and extrudable masses and substances having a particle or very high solids content and non-pelletizable substances such as piece goods can also be processed to form granules with high production throughput.

THE DRAWING

Two exemplary embodiments of the invention are described with reference to the accompanying drawings.

DETAILED DESCRIPTION

Figure 1:
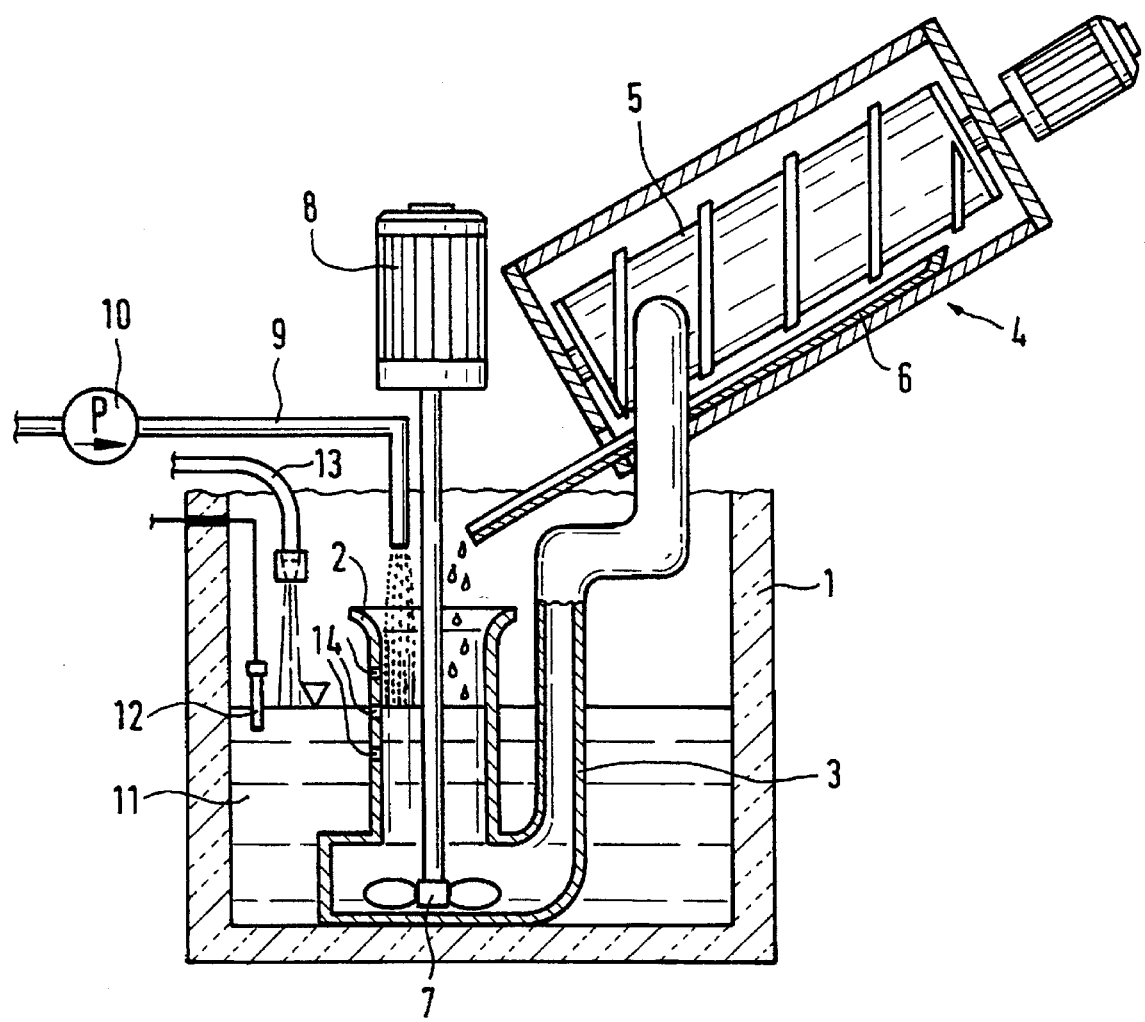
FIG. 1 shows an apparatus for carrying out the process according to the invention in diagrammatic form.

FIG. 1 shows an apparatus in which a reaction tube 2 is situated in an insulated vessel 1. The reaction tube 2 is vertically arranged and at the lower end converts laterally into a transport tube 3 which opens out by its upper end into a separation apparatus 4. The separation apparatus is essentially composed of a ribbon screw 5 having screen holes. Below the ribbon screw 5 is situated a discharge channel 6 which opens out into the reaction tube 2. At the bottom of the reaction tube 2 is situated a transport element 7, for example a propeller screw, which is driven via a motor 8. Above the reaction tube 2 is situated a product entry 9 having a feed pump 10. In the insulated vessel 1 is situated a liquid nitrogen bath 11. The filling height of the bath can be controlled by a level controller 12 and a liquid nitrogen feed 13. The liquid nitrogen bath 11 is connected via orifices 14 to the interior of the reaction tube 2 so that the interior of the reaction tube is supplied with liquid nitrogen.

Figure 2:
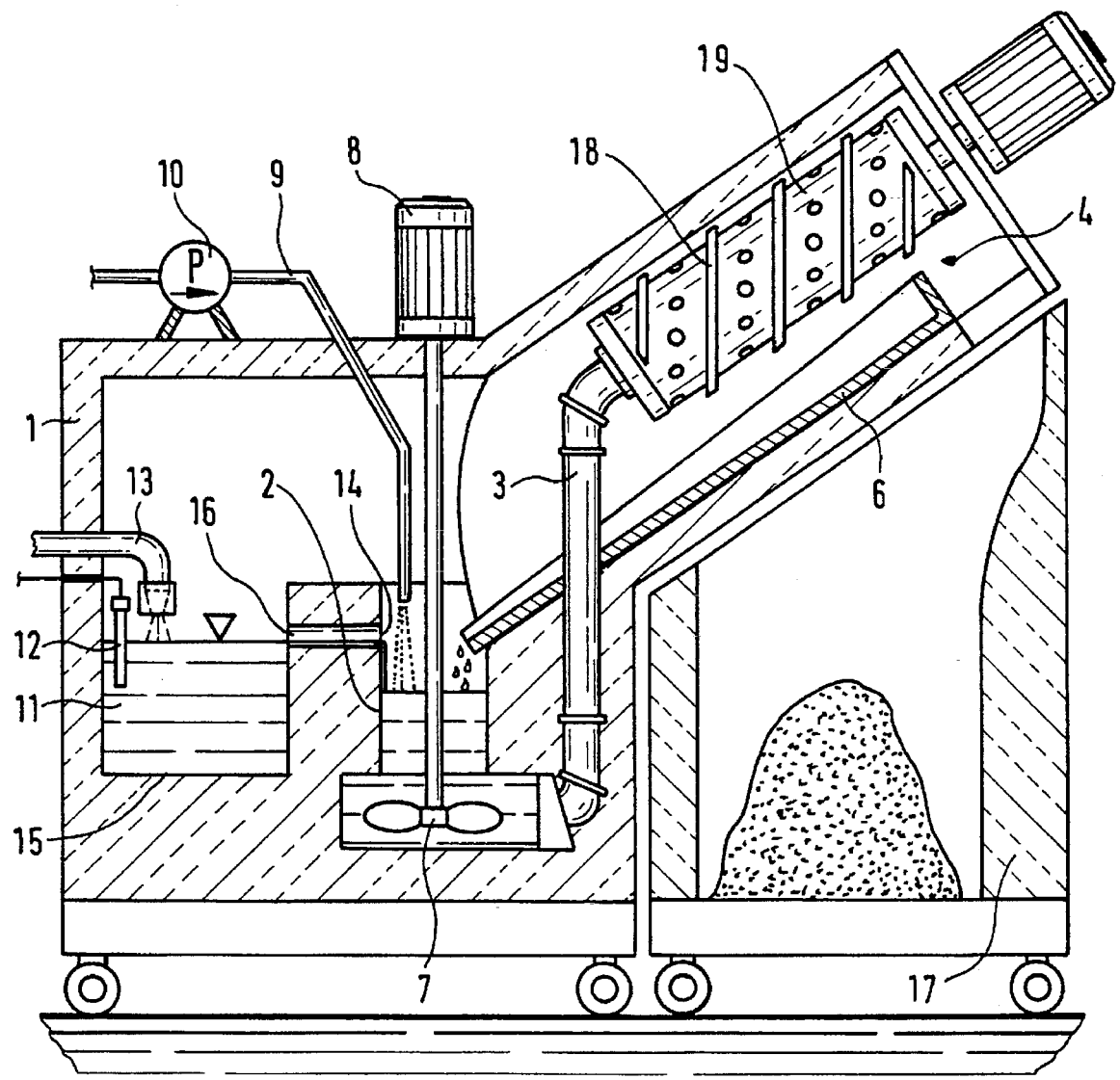
FIG. 2 shows a modification of the apparatus in FIG. 1.

FIG. 2 shows an apparatus in which control of the amount of refrigerant in the reaction tube 2 and thus in the refrigerant circulation is ensured by a compensation vessel 15 having a connection 16 to the reaction tube 2. The compensation vessel has a level controller 12 and a liquid nitrogen feed 13. The filling of the reaction tube 2 results from the level controller 12 in combination with various crosssections of the orifice 14 of the connection 16. The crosssection can be varied by various inserts. The granulated product is transported into a collection vessel 17. The separation apparatus used in this embodiment is a conveyor screw 18 having a screen drum 19.

In operation, the product to be processed, for example a pasty mass, such as bread starter, is then transported by a monopump 10 through the product entry 9 in the form of a closed jet into the reaction tube 2. By pressurizing the jet, high feed rates are possible. The liquid nitrogen situated in the reaction tube 2 is agitated by the propeller in such a way that a flow directed downwards with high velocity of the liquefied gas is formed which is led off through the transport tube 3 into the separation apparatus 4. The liquid nitrogen can flow to the discharge channel 6 Through the screen holes of the ribbon screw 5 or the screen drum 19 of the conveyor screw 18. This arrangement recirculates the liquid nitrogen back to the reaction tube 2. The bread starter introduced in a closed jet according to the invention is broken up into granule particles as a result of the turbulences and the high velocity of the liquid nitrogen and is frozen by the cold and fixed in shape. The granule particles thus formed are introduced by this flow through the transport tube 3 into the ribbon screw 5 or into the conveyor screw 18 having the screen drum 19 and transported into the collection vessel 17. The excess liquid nitrogen flows according to the invention through the discharge channel 6 back into the reaction tube 2 and is fed back to the refrigerant circulation. The flow velocity of the liquid nitrogen volume can be varied by the speed of rotation of the propeller. In a preferred use form, the velocity of the moving liquid nitrogen volume is greater than the penetration velocity of the substance to be granulated substance. A refrigerant velocity is preferred which is greater by a factor of 1.5 to 4 than that of the introduced substance to be granulated. If the entry velocity of the substance to be granulated and the flow velocity of the liquid nitrogen are equal, only the turbulences of the refrigerant flow still contribute to the granulation. Thus results which are likewise still useful are achieved at any rate. The filling height of the insulated vessel 1 can be controlled and the interior of the reaction tube 2 is connected via orifices 14 to the insulated vessel 1, or in the embodiment according to FIG. 2 is fed with refrigerant by the compensation vessel 15 through the connection 16. Accordingly at a given flow velocity, over different filling levels, a different flow path length and thus a different residence time can be achieved. The insulated vessel 1 thus functions exactly as a compensation vessel, as does the condensation vessel 15 in FIG. 2, with respect to the amount of refrigerant which is in circulation. Obviously, apart from liquid nitrogen, other refrigerants can also be used. Depending on the production rate, the jet of the product introduced can be made to be as strong as desired. Optionally, a plurality of product jets can also be introduced into the moving liquid volume. In the case of granulation of substances which have pasty properties, the exiting jet has the form of a rope.

The moving refrigerant liquid volume must not be orientated with its flow parallel to the direction of the influx or injection of the product to be processed. And arrangement is alternatively practicable in which a refrigerant flow is present at an angle to the inflow direction of the substance to be granulated. Likewise, the substance to be granulated can be introduced into a refrigerant vortex or into a flow which has rotating directional components.

Furthermore, by means of the process according to the invention, for example, the following products can also be processed to give granules:

biological solutions containing living microorganisms starter cultures (solutions having an approx. 20% solids content)

egg yolk (approx. 30% solids)

protein whole egg sewage sludge for reactivating sedimentation tanks after erroneous introductions (containing solid particles 1-2 mm $\phi$)

Bolognaise sauce (minced meat portion)

goulash soup (containing meat having an edge length of approx. 1.5 cm)

pea soup lentil soup mushroom soup containing sliced mushrooms isopropanol peroxide liquid flavorings fruit pulp fruit preparations extrudable masses, such as thickened bacterial cultures, e.g. yeasts pasty masses of rye flour, water and yeasts, such as bread starter extracts, e.g. cough syrup extract plastic melts which are used for example for producing granules as a support for catalysts coffee concentrate.

What is claimed is:

1. A process for the granulation of substances in which the substances to be granulated are introduced from at least one product entry into the volume stream of a liquid refrigerant, which comprises introducing into a reactor the substance to be granulated from the product entry as a closed jet into the refrigerant flowing in circulation essentially in the direction of the jet, the refrigerant flowing in a stream in the reactor to a location out of the reactor in essentially the same direction as the substance to be granulated, and in the course of this flow in the reactor the flowing refrigerant stream breaking up the substance to be granulated and freezing it.

2. A process for the granulation of substances in which the substances to be granulated are introduced from at least one product entry into the volume stream of a liquid refrigerant, which comprises introducing the substance to be granulated from the product entry as a closed jet into the refrigerant flowing in circulation essentially in the direction of the jet and in the course of this breaking up the substance to be granulated and freezing it, and wherein the velocity of the refrigerant stream is equal to or greater than the entry velocity of the substance to be granulated.

3. The process as claimed in claim 2, wherein the velocity of the refrigerant stream is 1.5 to 4 times that of the entry velocity of the substance to be granulated.

4. The process as claimed in claim 3, wherein the substance to be granulated is introduced into liquid nitrogen.

5. The process as claimed in claim 2, wherein the substance to be granulated is introduced into liquid nitrogen.

6. A process for the granulation of substances in which the substances to be granulated are introduced from at least one product entry into the volume stream of a liquid refrigerant, which comprises introducing the substance to be granulated from the product entry as a closed jet into the refrigerant flowing in circulation essentially in the direction of the jet and in the course of this breaking up the substance to be granulated and freezing it, and wherein the velocity of the refrigerant stream is 1.5 to 4 times that of the entry velocity of the substance to be granulated.

7. An apparatus for carrying out the process as claimed in claim 1 composed of a reaction tube, a transport element and a product feed apparatus over the upper end of the reaction tube, means for feeding the substance from the product feed apparatus as a closed jet, a reaction tube and a separation apparatus external of the reactor connected to the transport tube, means for flowing the refrigerant as a stream from the reactor to the separation apparatus in essentially the same direction as the substance to be granulated whereby the flowing refrigerant stream breaks up and freezes the substances, and wherein a discharge channel for the refrigerant is assigned to the separation apparatus, which discharge channel opens out into the upper end of the reaction tube.

8. An apparatus for carrying out the process for the granulation of substances in which the substances to be granulated are introduced from at least one product entry into the volume stream of a liquid refrigerant, which comprises introducing the substance to be granulated from the product entry as a closed jet into the refrigerant flowing in circulation essentially in the direction of the jet and in the course of this breaking up the substance to be granulated and freezing it, the apparatus including a reaction tube, a transport element and a product feed apparatus over the upper end of the reaction tube, a reaction tube and a separation apparatus connected to the transport tube, wherein a discharge channel for the refrigerant is assigned to the separation apparatus, which discharge channel opens out into the upper end of the reaction tube, and wherein the reaction tube is surrounded by a refrigerant-containing insulated vessel designed as a compensation vessel and the reaction tube possesses orifices for the feed of refrigerant from the insulated vessel.

9. An apparatus for carrying out the process for the granulation of substances in which the substances to be granulated are introduced from at least one product entry into the volume stream of a liquid refrigerant, which comprises introducing the substance to be granulated from the product entry as a closed jet into the refrigerant flowing in circulation essentially in the direction of the jet and in the course of this breaking up the substance to be granulated and freezing it, the apparatus including a reaction tube, a transport element and a product feed apparatus over the upper end of the reaction tube, a reaction tube and a separation apparatus connected to the transport tube, wherein a discharge channel for the refrigerant is assigned to the separation apparatus, which discharge channel opens out into the upper end of the reaction tube, and wherein the reaction tube is connected by an orifice situated in its wall and a connection to a refrigerant-containing compensation vessel which is equipped with a level controller.

10. The apparatus as claimed in claim 9 wherein the separation apparatus is conveyor screw having a screen drum.

11. An apparatus for carrying out the process for the granulation of substances in which the substances to be granulated are introduced from at least one product entry into the volume stream of a liquid refrigerant, which comprises introducing the substance to be granulated from the product entry as a closed jet into the refrigerant flowing in circulation essentially in the direction of the jet and in the course of this breaking up the substance to be granulated and freezing it, the apparatus including a reaction tube, a transport element and a product feed apparatus over the upper end of the reaction tube, a reaction tube and a separation apparatus connected to the transport tube, wherein a discharge channel for the refrigerant is assigned to the separation apparatus, which discharge channel opens out into the upper end of the reaction tube, and wherein the separation apparatus is conveyor screw having a screen drum.

12. An apparatus for carrying out the process as claimed in claim 4 composed of a reaction tube, a transport element and a product feed apparatus over the upper end of the reaction tube, a transport tube for the mixture of refrigerant and granules from the reaction tube and a separation apparatus connected to the transport tube, wherein a discharge channel for the refrigerant is assigned to the separation apparatus, which discharge channel opens out into the upper end of the reaction tube.

13. The apparatus as claimed in claim 12, wherein the reaction tube is surrounded by a refrigerant-containing insulated vessel designed as a compensation vessel and the reaction tube possesses orifices for the feed of refrigerant from the insulated vessel.

14. The apparatus as claimed in claim 13, wherein the reaction tube is connected by an orifice situated in its wall and a connection to a refrigerant-containing compensation vessel which is equipped with a level controller.

15. The apparatus as claimed in claim 14 wherein the separation apparatus is conveyor screw having a screen drum.

16. The apparatus as claimed in claim 12 wherein the separation apparatus is conveyor screw having a screen drum.

\* \* \* \* \*

UNITED STATES PATENT AND TRADEMARK OFFICE
CERTIFICATE OF CORRECTION

PATENT NO. : 5,661,981
DATED : September 2, 1997
INVENTOR(S) : Peter Laux, et al.

It is certified that error appears in the above-identified patent and that said Letters Patent is hereby corrected as shown below:

On the cover page of the patent line [54] and Col. 1, line 1,

"SUBSTRANCES" should be "SUBSTANCES";

On the cover page of the patent line [73] "Gese" should be "Gase".

Signed and Sealed this

Third Day of March, 1998

*Attest:*

BRUCE LEHMAN

*Attesting Officer*    Commissioner of Patents and Trademarks